(12) United States Patent
Vaks et al.

(10) Patent No.: US 9,323,588 B2
(45) Date of Patent: Apr. 26, 2016

(54) SERVICE PLATFORM ARCHITECTURE

(71) Applicant: Comcast Cable Communications, LLC, Philadelphia, PA (US)

(72) Inventors: Vadim Vaks, Philadelphia, PA (US); Paul Roach, Downington, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 303 days.

(21) Appl. No.: 13/828,210

(22) Filed: Mar. 14, 2013

(65) Prior Publication Data

US 2014/0280703 A1    Sep. 18, 2014

(51) Int. Cl.
*G06F 15/16* (2006.01)
*G06F 9/54* (2006.01)

(52) U.S. Cl.
CPC .................................... *G06F 9/54* (2013.01)

(58) Field of Classification Search
None
See application file for complete search history.

(56) References Cited

U.S. PATENT DOCUMENTS

| | | | | |
|---|---|---|---|---|
| 8,296,411 | B2 * | 10/2012 | Concini et al. | 709/223 |
| 2008/0168130 | A1 * | 7/2008 | Chen et al. | 709/203 |
| 2011/0004701 | A1 * | 1/2011 | Panda et al. | 709/242 |
| 2011/0252262 | A1 * | 10/2011 | Yoshihara et al. | 713/375 |

* cited by examiner

*Primary Examiner* — John B Walsh
(74) *Attorney, Agent, or Firm* — Banner & Witcoff, Ltd.

(57) ABSTRACT

Requests received at a service platform may be processed either synchronously or asynchronously, based on, for example, a determination of the expected response time for the service request. Some embodiments may include separate hardware infrastructures and/or may support service requests designated for asynchronous processing.

20 Claims, 4 Drawing Sheets

400a

| Service | Operation | Date /Time | Response Time |
|---|---|---|---|
| User Accounts | Get_Account_Balance | 1-11-12 15:45:03.71 | 0.24 sec |
| User Accounts | Get_Account_Balance | 1-11-12 15:45:06:88 | 0.32 sec |
| User Accounts | Get_Account_Balance | 1-11-12 15:45:07:18 | 0.45 sec |
| User Accounts | (other user-related operation) | 1-11-12 15:45:07:89 | 0.27 sec |
| User Accounts | (other user-related operation) | 1-11-12 15:45:08:67 | 0.31 sec |
| User Accounts | (other user-related operation) | 1-11-12 15:45:09:21 | 0.42 sec |
| User Accounts | (other user-related operation) | 1-11-12 15:45:10:46 | 0.19 sec |
| User Accounts | (other user-related operation) | 1-11-12 15:45:10:70 | 0.37 sec |

FIG. 4A

400b

| Service | Operation | Current Ave. Resp. Time |
|---|---|---|
| User Accounts | Open_Account | 2.14 sec |
| User Accounts | Close_Account | 1.78 sec |
| User Accounts | Get_Cust_Address | 0.33 sec |
| User Accounts | Update_Cust_Address | 1.26 sec |
| User Accounts | Get_Account_Balance | 0.49 sec |
| User Accounts | Make_Payment | 4.47 sec |
| User Accounts | Last_Payment_Info | 1.36 sec |
| User Accounts | Add_User_To_Account | 6.10 sec |

FIG. 4B

SERVICE PLATFORM ARCHITECTURE

BACKGROUND

Software services may include related sets of software functions provided by back-end service providers. In many businesses and organizations, different software services may be implemented on different systems and by different service providers. For example, in context of business or enterprise software, software services may correspond to business functions such as customer account systems, financial systems, order management systems, payroll systems, employee systems, etc.

A service platform may be used in service-oriented architectures and other software designs to provide a common interface through which different software services may be accessed by service consumers. Service platforms may allow service consumers to invoke the functionality of different software services without understanding the different technologies and implementation details of each service. For example, a service platform may publish a common interface including all services supported by the platform, thereby allowing consumers to access different software services without the consumer knowing which service provider(s) are providing the services, where the service providers are located, or what interfaces and languages are required to access the services. Additionally, service platforms may allow service providers to update their software services, change systems, and change interfaces, in a manner transparent to front-end consumers. The widespread use of service platforms places high demand on their hardware and software infrastructure, and there are sometimes delays in receiving requested service. There remains an ever-present need for efficient management of service platform resources, to provide the best service possible within the available resources. These and other shortcomings in resource management are addressed in this disclosure.

BRIEF SUMMARY

The following presents a simplified summary of the disclosure in order to provide a basic understanding of some aspects. It is not intended to identify key or critical elements of the disclosure or to delineate the scope thereof. The following summary merely presents some concepts of the disclosure in a simplified form as a prelude to the more detailed description provided below.

According to one or more aspects, a service platform providing an interface to one or more service providers may receive and process service requests from service consumers. The service platform may receive service requests from the consumer applications, and process the service requests either synchronously or asynchronously, based on a determination of the expected response time for the service request. The service platform may route each incoming service request to a processing infrastructure after determining the expected response time. In certain examples, separate processing infrastructures may be implemented using, for example, the elements shown in FIG. 2, and may have partially different or entirely different hardware/software resources used for processing service requests synchronously or asynchronously.

According to additional aspects, a communication link such as a service bus comprising one or more computer servers may be configured to receive and process incoming service requests. A separate messaging bus comprising one or more computer servers may be used for service requests designated for asynchronous processing. The service bus may forward service requests designated for asynchronous processing to the messaging bus, for example, based on a determination of the expected response time. For service requests processed synchronously, the service bus may maintain one or more open threads during the processing of the service requests in order to maintain connections to the consumer applications, await responses from processing servers, and perform other functions related to the processing of the service requests. In contrast, for service requests processed asynchronously, the service bus may close certain some or all of the related process threads after forwarding the service requests to the messaging bus, which may use a different thread management system for processing requests asynchronously and returning responses to consumer applications.

The details of these and other embodiments of the present disclosure are set forth in the accompanying drawings and the description below. Other features and advantages of the invention will be apparent from the description and drawings, and from the claims.

BRIEF DESCRIPTION OF THE DRAWINGS

The present disclosure is illustrated by way of example and not limited in the accompanying figures in which like reference numerals indicate similar elements and in which:

FIGS. 4A-4B are example data structures containing data corresponding to response times, according to one or more aspects described herein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will by one of skill in the art upon reading the following disclosure, various aspects described herein may be appreciated embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, removable storage media, solid state memory, RAM, magnetic storage devices, and/or any combination thereof. In addition, the functionality may be embodied in whole or in part in firmware or hardware equivalents, such as integrated circuits, field programmable gate arrays (FPGAs), and the like. Various signals representing data or events as described herein may be transferred between a source and a destination in the form of electromagnetic waves traveling through signal-conducting media such as metal wires, optical fibers, and/or wireless transmission media (e.g., air and/or space).

Figure 1:
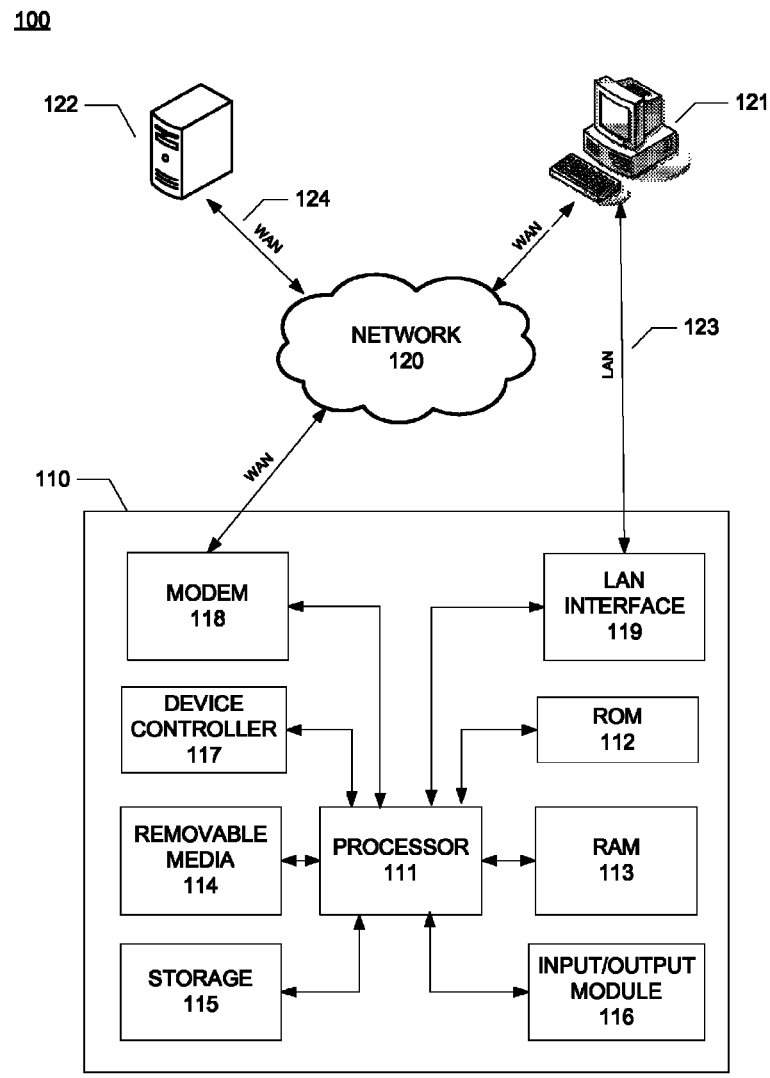
FIG. 1 illustrates example computing hardware/software and a computer system in which various features discussed herein may be implemented.

FIG. 1 illustrates an example computing environment 100 and general elements of a computing device 110 that can be used to implement any of the various computing devices and systems discussed herein, such as service buses, processing services, and other service platform components. The computing device 110 (e.g., a computer server within a service bus or messaging bus, or other service platform component) may include one or more processors 111, which may execute instructions of a computer program to perform any of the features described herein. The instructions may be stored in any type of computer-readable medium or memory, to configure the operation of the processor 111. For example, instructions may be stored in a read-only memory (ROM) 112, random access memory (RAM) 113, removable media 114, such as a Universal Serial Bus (USB) drive, compact disk (CD) or digital versatile disk (DVD), floppy disk drive, or any other desired electronic storage medium. Instructions may also be stored in an attached (or internal) storage 115 (e.g., hard drive, flash, etc.). The computing device 110 may include one or more input and/or output devices 116, such as a keyboard, mouse, touch screen, microphone, and a display (or an external monitor), and may include one or more output device controllers 117, such as a video processor. The computing device 110 may also include one or more network interfaces 118-119, such as input/output circuits (such as a network card) to communicate with one or more external networks 120. The network interfaces 118-119 may be a wired interface, wireless interface, or a combination of the two. In some embodiments, the network interfaces may include a local area network (LAN) interface 119 and/or modem 118 (e.g., a cable modem) for communicating with the one or more communication networks (e.g., the Internet) 120 and/or one or more other computing devices 121-122 over a LAN or wide area network (WAN). In some embodiments, the network 120 may include communication lines, the external networks 120, internal networks, a provider's wireless, coaxial, fiber, or hybrid fiber/coaxial distribution system (e.g., a DOCSIS network), or any other desired computer network or other communication network.

A computing device 110 of a service bus, a messaging bus, a processing server, or other service platform component may operate in the computing environment 100 supporting connections to one or more remote computers, such as computing devices 121 and 122. For example, devices 121 and 122 may be computer servers within the service platform, or may be servers or other computing devices outside of the service platform, such as service consumers or service providers. Computing devices 121 and 122 may include some or all of the elements described above with respect to the computing device 110. The network connections depicted in FIG. 1 include a local area network (LAN) 123 and a wide area network (WAN) 124, but may also include other networks. When used in a LAN networking environment, the computing device 110 may be connected to the LAN 123 through a network interface or adapter 119. When used in a WAN networking environment, the computing device 110 may include a modem 118 or other means for establishing communications over the WAN 124, such as communication network 120 (e.g., the Internet). The device 110 also may be used in a wireless telecommunications network, and may include one or more transceivers, digital signal processors, and additional circuitry and software for communicating with wireless computing devices (e.g., mobile phones) via one or more network devices (e.g., base transceiver stations) within the wireless network.

It will be appreciated that the network connections shown are illustrative and other means of establishing a communications link between the computers may be used. The existence of any of various network protocols such as TCP/IP, Ethernet, FTP, SOAP, HTTP and the like, and of various wireless communication technologies such as GSM, CDMA, WiFi, and WiMAX, is presumed, and the various computing devices and system components described herein may be configured to communicate using any of these network protocols or technologies.

FIG. 1 shows an example configuration. Modifications may be made to add, remove, combine, divide, etc., components as desired, and some or all of the elements may be implemented using software. Additionally, the components illustrated may be implemented using basic computing devices and components, and the same components (e.g., processor 111, ROM 112, user input/output devices 116, etc.) may be used to implement any of the other computing devices and components described herein. For example, the various components herein may be implemented using computing devices having components such as a processor executing computer-executable instructions stored on a computer-readable medium (e.g., storage 115), as illustrated in FIG. 1.

Figure 2:
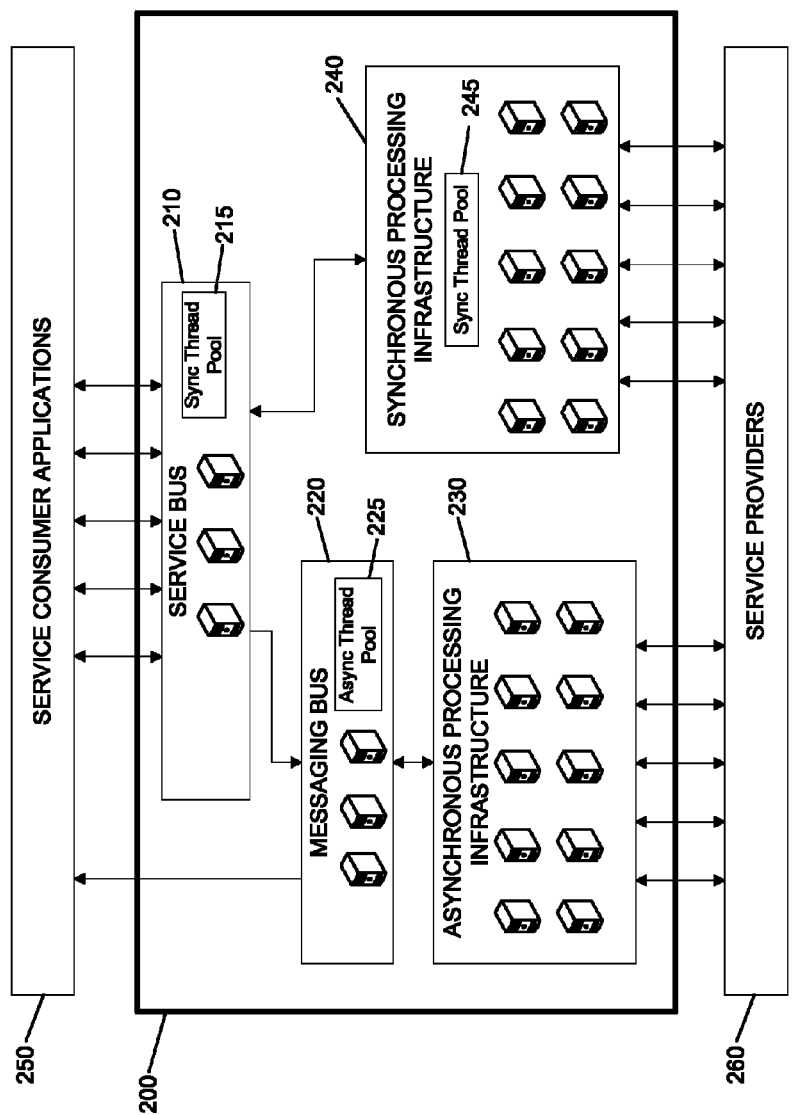
FIG. 2 illustrates an example service platform architecture, according to one or more aspects of the disclosure.

FIG. 2 illustrates an example service platform architecture in accordance with aspects of the disclosure. In this example, a service platform 200 is provided to support interaction between a set of service consumer applications 250 and a set of service providers 260. The service platform 200 in this example may be used as part of a service-oriented architecture (SOA) or other software system design. In such designs, a service platform 200 may provide a common interface through which a variety of back-end software services from different service providers 260 may be accessed by front-end service consumers 250. As discussed above, a software service may be a set of related software functions (or operations) and/or data provided by a software provider 260. In the context of business or enterprise software, software services may implement and/or perform business functions such as customer account systems, financial systems, order management systems, payroll systems, employee systems, etc.

In a service platform architecture, as shown in FIG. 2, the back-end service providers 260 may publish their services (e.g., functionalities supported, types of interfaces, software languages and technologies used) to the service platform 200. Each back-end service provider 260 may provide its services from different locations, over different networks, and using different computer systems and technologies. For example, a single enterprise may have services built with .NET, JAVA, or Web Services Business Process Execution Language (WS-BPEL) technologies, as well as other services provided by databases, mainframes and various legacy systems. These services may or may not be compatible with one another, and may provide different interfaces and different levels of compatibility with various client applications that wish to use the services.

The service platform 200 may include middleware providing a consistent and well-defined interface to allow service consumers 250 to invoke the functionality of the back-end service providers 260. Service consumers 250 may include any front-end application configured to access a service of a service provider 260 via the service platform 200. In the business or enterprise context, service consumers 250 may include various software tools (e.g., web-based and console applications) configured to be used by employees, customers, and administrators. For examples, service consumers 250 may include application servers, web servers, and mobile client servers running customer-facing web-based applications to allow customers to place orders, review and pay bills, update account details, etc. Other service consumers 250 may include enterprise servers running employee-facing applications to allow employees to review and update customer orders, process customer payments, updated customer account details, and perform business accounting and human resources (HR) functions, etc.

By publishing a common, well-defined, interface, the service platform may allow service consumers 250 to invoke the functionality of various service providers 260 without needing to understand the various technologies and implementation details of each service. In certain embodiments, service consumers 250 may access back-end services without needing to know which service provider(s) 260 are providing the service, where the service providers 260 are located, or what interfaces and languages are required to access the services. Additionally, the service platform 200 may allow service providers 260 to upgrade services, change systems, and change interfaces, in a manner transparent to the service consumers 250.

Within the service platform 200, a service bus 210 (e.g., an enterprise service bus) may receive service requests from consumer applications 250 and route the service requests to processing hardware and software, such as processing infrastructure 230 or 240. As shown in FIG. 2, the service bus 210 may include a plurality of computer servers each configured to receive and handle incoming requests from consumer applications 250. The servers and other hardware/software components within the service bus may operate within a single data center or may be distributed among multiple data centers. For instance, a business may maintain multiple data centers at different geographic locations, each data center having one or more service bus computer servers. In this example, each service bus computer server may be configured to receive incoming service requests and forward the service requests to processing servers within the same data center.

In the example shown in FIG. 2, the service platform includes a messaging bus 220 in addition to the service bus 210. As discussed below in reference to FIG. 3, the messaging bus 220 may be used to process service requests asynchronously. As described below, asynchronous processing of a software task may involve calling software functions such that the function calls are returned without waiting until the underlying operations within the called functions are completed. In contrast, synchronous processing of a software task may involve holding open (or blocking) process threads that call software functions until the underlying operations are completed. For example, in the service platform architecture shown in FIG. 2, synchronous processing of a service request may involve routing the service request from the service bus 210 to the synchronous processing infrastructure 240, while holding open a calling thread (and/or one or more additional threads) in the service bus 210 until the underlying processing is completed by the synchronous processing infrastructure 240. In contrast, when asynchronously processing of a service request, the service request may be routed to the asynchronous processing infrastructure 230 without holding open the calling thread (and/or additional threads) related to the service request.

In some embodiments, service requests arriving at the service bus 210 may be classified either as short-running or long-running Short-running requests may be routed to a synchronous processing infrastructure 240, while long-running requests may be routed through the messaging bus 220 to an asynchronous processing infrastructure 230. The service bus 210 may support an associated thread pool 215 for handling synchronous service requests, and the messaging bus 220 may support an asynchronous thread pool 225. The synchronous processing infrastructure 240 also may include a thread pool 245, corresponding to the thread pool 215 in the service bus 210. As discussed below, when processing service requests synchronously, the service bus 210 may hold open one or more process threads (e.g., a thread waiting to receive a response from the synchronous processing infrastructure 240), while the synchronous processing infrastructure 240 may hold open one or more corresponding process threads at the same time (e.g., a thread waiting to transmit the response to the service bus 210). Thread pools 215, 225, and 245 may be information stored identifying processing capacity (e.g., processing time, running programs or routines, etc.) of one or more processors in the system 200. That information may represent the capacity as distinct active processes, or threads, and each pool may contain a predetermined or fixed number of threads. In some cases, the computer servers and other devices within the service bus 210 and messaging bus 220 may be configured to allocate new threads, or additional processing resources, whenever they are needed, so long as sufficient memory, processing capacity, and other resources are available to allocate new threads. However, because such computer resources are finite, the number of open threads in the thread pools 215, 225, and 245 may be limited by the hardware/software limitations of the service bus 210, messaging bus 220, and synchronous processing infrastructure 240. Additionally, as discussed below, the messaging bus 220 may be configured to provide responses directly to the appropriate consumer application 250, for service requests processed asynchronously. For service requests processed synchronously, one or more threads may be kept open within the synchronous thread pool 215 to receive responses and transmit the responses to the consumer applications 250.

Each processing infrastructure 230 and 240 may include a plurality of computer servers and/or other hardware/software components configured to receive and process service requests. A service request may be assigned to particular server with the processing infrastructure 230 and 240, or may be processed by multiple servers. In order to process a service request, one or more services supported by back-end service providers 260 may be identified and invoked (or called) by a processing server 230 or 240. Data received from the service providers 260 may be further analyzed, processed, and/or formatted at the processing servers 230 or 240 before being returned to the consumer applications 250 via the service bus 210 and/or the messaging bus 220. For example, if a service request to update customer information is received from customer account maintenance application 250, a processing server 230 may identify the correct back-end service provider(s) 260, and the specific software service(s) and operations to be invoked, and then may invoke the services and operations to update the customer information. After updating the customer information in accordance with the service request, the processing server 230 may send a response back to the service bus 210 or the messaging bus 220 confirming the completion of the request and/or providing return information if information was requested.

Some service requests may require that the processing server 230 access and call operations for multiple back-end services 260, such as one or more web services, legacy software systems, and/or customer databases. Such calls may be made in series or parallel. For example, a service request to retrieve status information for a product order may require calls to multiple back-end services (e.g., a customer account service, an order database, and a shipping service). In this example, the processing server 230 may access all three back-end service providers 260, compile and format the information retrieved from the services into a single piece of data or collection of data, and then send the compiled response back to the service bus 210 or the messaging bus 220. As other example, a service request to close a customer account may require a processing server 230 to access multiple services 260 in series. For instance the processing server 230 may first access an account payment service to confirm the customer's account balance and contract status. After confirming that the customer's account balance and contract status allow the customer to close the account the processing server 230 may access a customer account service to close the account.

In certain embodiments, the synchronous processing infrastructure 230 may consist of partially or entirely separate hardware/software from the asynchronous processing infrastructure 240, so that there is little or no overlap in the hardware/software resources (e.g., processing servers, memory devices, load balancers, networks and networking hardware, etc.). For instance, as shown in FIG. 2, the synchronous processing infrastructure 230 may receive service requests and provide responses exclusively to the service bus 210, while the asynchronous processing infrastructure 240 may receive service requests and provide responses exclusively to the messaging bus 220. When there is no (or minimal) overlap of hardware/software resources between the processing infrastructures 230 and 240, a backlog, thread shortage, or hardware or software bottleneck in processing service requests in one processing infrastructure need not affect the performance of the other processing infrastructure.

As described above, the example service platform 200 shown in FIG. 2 includes a separate messaging bus 220, separate thread pool 225, and separate processing infrastructure 240 for processing certain service requests asynchronously, while other service requests are processed synchronously using the service bus 210 and processing infrastructure 230. However, in other embodiments, a messaging bus 220 need not be used in the service platform 200. In such cases, the service bus 210 may directly route service requests for asynchronous processing to an asynchronous processing infrastructure 240. Additionally, in some examples, the synchronous processing infrastructure 230 and asynchronous processing infrastructure 240 need not be entirely separate, but may be logically separate while sharing some (or all) hardware/software components (e.g., processing servers, memory devices, load balancers, networks and networking hardware, etc.) For example, physically separate processing hardware/software may be dedicated for synchronous processing infrastructure 230 and asynchronous processing infrastructure 240, and the number of servers at each processing infrastructure may be adjusted dynamically based on the observed load. If either processing infrastructure 230 or 240 is consistently overutilizing or underutilizing its processing hardware/software, then hardware may be added to or removed from the processing infrastructure, as determined based on the observed load. In this example, the network components may be shared between the infrastructures 230 and 240 having physically separate processing hardware/software, or there also may be separate physical network components for each processing infrastructure.

Having described examples of computing devices and configurations that may be used in implementing various aspects of the disclosure, such as service platforms 200, service buses 220, and service processing servers 230 and 240, examples illustrating receiving, processing, and responding to service requests will now be described in greater detail.

Figure 3:
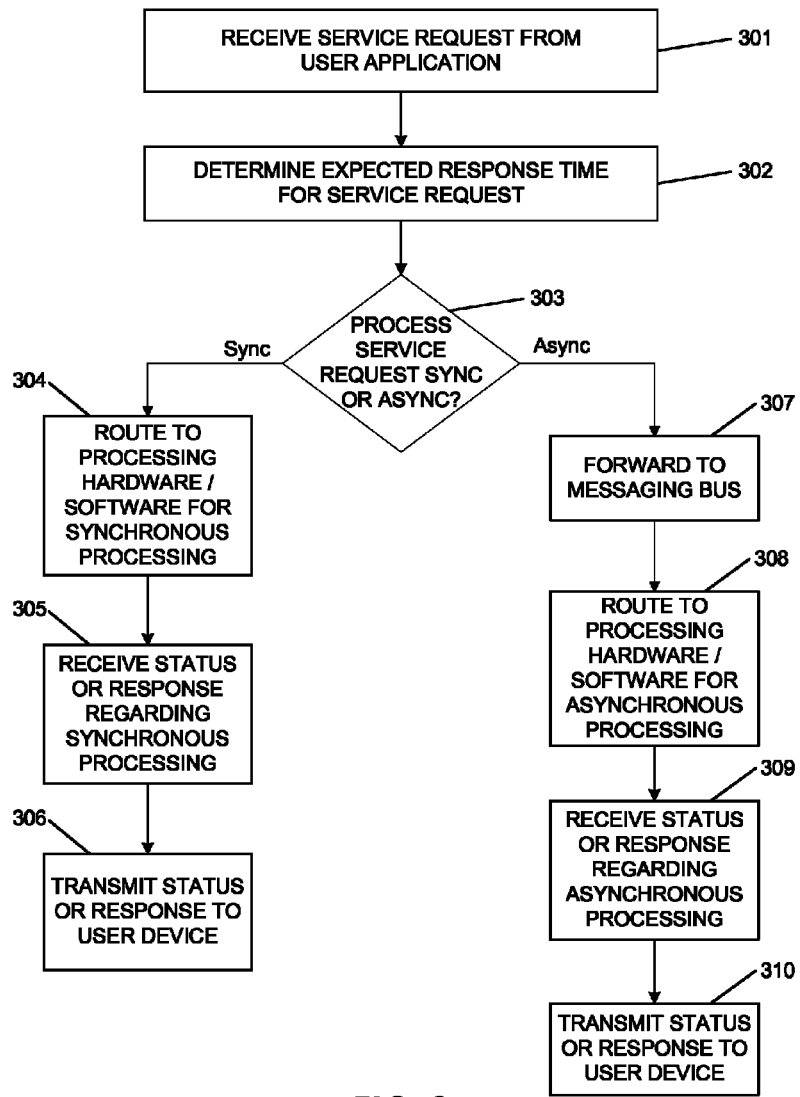
FIG. 3 is a flow diagram illustrating an example process for receiving and processing service requests, according to one or more aspects of the disclosure.

Referring now to FIG. 3, flow diagram is shown illustrating an example process for receiving and handling service requests at a service platform 200, according to various aspects of the disclosure. The steps of FIG. 3 described below may be performed by one or more computing devices 110 within a service platform 200, for example, a computer server in a service bus 210, messaging bus 220, processing infrastructure 230 or 240, or a combination of servers performing different functions within the service platform 200.

In step 301, a service request from a user application (e.g., consumer application 250) is received within a service platform 200. For example, a computer server 110 within a service bus 210 may receive a service request from a consumer application 250, such as an application server, web server, and/or mobile client server running software applications for users. Such software applications may include business software designed for customers and employees to perform business-related functionality, for example, placing product orders, opening accounts, paying bills, etc. Consumer applications 250 may be web-based applications, console applications, or other software applications configured invoke middleware within the service platform 200.

In step 302, an expected response time may be determined for the service request received in step 301. An expected response time may be determined or calculated by a system 200 processor as a number of seconds/milliseconds between the time the service request is received from the consumer application 250 and the time of the expected response back to the service application. In other examples, the expected response time may take different forms, such as a percentile or ranking of the expected response time of the received service request in comparison to other service requests processed by the service platform 200. An expected response time also may take the form of an enumerated or binary value (e.g., long-running request, short-running request, etc.).

The determination of the expected response time in step 302 may be based on the type of the service request (e.g., the service provider 260, specific software system or service, and/or operation or function calls), along with additional factors. For example, a simple type of service request (e.g., retrieval of information from a back-end database or single service provider 260) may generally execute faster than a complex type of service request (e.g., invoking functions from different service providers 260 and additional complex data processing). Accordingly, in some embodiments, determinations of expected response time may be performed before any service requests are received, such as when the support for the service requests is first implemented or when the interfaces are published by the service platform 200. In such examples, expected response times for service requests may be predetermined based on the complexity of the requests, the number and type of the service providers 260 involved in processing the request, and the amount of processing involved in the service request. The system 200 may store information in memory identifying the various services being offered, and for each service, an identification of one or more predetermined response times associated with the service.

In other embodiments, the expected response times for service requests might not be predetermined, but may be determined in real-time for each service request, that is, after receiving the service request and before routing the request to processing hardware/software 230 or 240. For example, in some service-oriented architectures and other software systems, response times for software services may vary based on a number of factors, such as the current processing load, network conditions, and other resource usage within the service platform 200 and at the service providers 260. Additionally, conditions at specific service providers 260, for example, network congestion, server failures, power outages, etc., may temporarily affect the response times for requests to impacted services and any other services depending on the impacted services. Therefore, certain service requests that generally may execute quickly under normal conditions may have slow expected response times at certain times and under certain conditions, and vice versa.

Therefore, after a service request is received, the service platform 200 may calculate an expected response time for the service request, for example, by using response time data for previous service requests of the same type. Referring briefly to FIG. 4A, an example data table 400a is shown including a set of previous response times for one or more illustrative service request types (e.g., the "Get_Account_Balance" operation) of the "User Account" software service. As noted above, service requests may correspond to single operations (or function calls), as in this example, or may correspond to multiple different operations from one or more different services, along with additional processing and formatting at the processors 230 and 240 after the data is retrieved from the service providers 260. In this example, the service request may correspond to an execution of a "Get_Account_Balance" function or another user-related function of a "User Account" software service supported by a service provider 260, and the formatting and returning of the user account information to the consumer application 250. In table 400a, data is listed relating to a number of previous service requests of this type, including the date and time of the service request, and the response time of the service request. As shown in table 400a, 8 service requests of this type (or types) were received and processed over of a time period of approximately 7 minutes, with response times ranging from 0.19 secs to 0.45 seconds. Based on such data from a recent time period, one or more computing devices in the service platform 200 may calculate an expected response time for a newly received service request of the same type.

Referring briefly to FIG. 4B, an example data table 400b is shown including a set of current expected response times for several different service requests supported by the "User Accounts" software service. The service requests, listed under the "Operation" column in table 400b, may be any user-related operations or services. The current expected response times shown in table 400b may be calculated using sets of recent response time data for the respective service request types, such as table 400a for the service request corresponding to the "Get_Account_Balance" operation of the "User Accounts" service. The expected response times shown in FIG. 4B may be calculated, for example, as a median, mean, or average values of previous sets of service request response times for the respective services and operations over a recent period of time. In other examples, in order to effectively manage the hardware/software resources in the service platform 200, an upper estimate or worst-case estimate of the expected response time may be calculated based on one or more of the slowest previous response times (e.g., by taking the maximum or averaging the largest few response times in a recent set of response times, etc.).

In the example data table 400b, each of the service requests corresponds to a single software operation (or function) supported by a single software service (i.e., "User Accounts") at one or more service providers 260. However, as discussed above, certain types of service requests received from user applications (e.g., consumer applications 250) may be more complex. Some service requests may require the service platform 200 to invoke multiple different software operations supported by different software services and/or at different service providers 260. For example, a first software function invoked at a service provider 260 during the processing of a service request may be configured to invoke a second software function at the same or a different service provider 260, either directly or by accessing the service platform 200. Only after both software functions have been completed (and potentially additional function calls and/or data processing), will the response to the service request be generated and transmitted back to the consumer application 250. Accordingly, response time data (e.g., table 400a) may be collected and stored for specific software functions and/or for service requests received from consumer applications 250. If response time data is stored for specific functions of specific software services, such data may be stored within the service provider 260 and/or within the service platform 200 (e.g., at one or more computing devices of a service bus 210).

When a service request requires (or potentially will require) multiple services and/or functions to be invoked in series, a computer server at the service bus 210 or other component may retrieve and add together the expected response times from the multiple services and/or functions to determine the expected response time for the service request. For instance, if a service request received from a consumer application 250 will require invoking functions from three different service providers 260, such as a product order service function (expected response time=1.1 secs), a customer account service function (expected response time=0.5 secs), and an inventory service function (expected response time=0.8 secs), then the service bus 210 may retrieve and add these values, add an additional anticipated processing time by the processing hardware/software 230 or 240 (e.g., 0.2), and return an expected response time for the service request of 2.6 seconds in this example. In other examples, rather than summing the expected response times for various functions within a service request, the service bus 210 or other component in the service platform 200 may maintain and update a single (i.e., end-to-end) expected response time for all service requests supported by the service platform 200.

In step 303, one or more computing devices in the service platform 200 may determine whether the service request received in step 301 should be processed synchronously (i.e., may select synchronous processing mode) or asynchronously (i.e., may select asynchronous processing mode). For example, a computer server in the service bus 210 may perform the determination in step 303 based on the expected response time determined in step 302 for the service request. If the expected response time indicates that the service request is likely to be a short-running service request, then the service bus 210 may determine that the service request should be processed synchronously (303:Sync). In this case, the service bus 210 may route the service request to a synchronous processing infrastructure 240 in step 304, and may keep open the calling thread within the service bus 210. Alternatively, if the expected response time indicates that the service request is likely to be a long-running service request, then the service bus 210 may determine that the service request should be processed asynchronously (303:Async). In this case, the service bus 210 may route the service request to a messaging bus 220 and then asynchronous processing infrastructure 230 in steps 307-308, and may close the calling thread within the service bus 210.

As discussed in more detail below, routing long-running service requests to a messaging bus 220 and/or asynchronous processing infrastructure 230, while routing short-running service requests to synchronous processing infrastructure 240, may provide potential advantages in performance and scalability for the service platform 200. For example, when processing service requests synchronously, one or more calling threads within the service bus 210 and/or processing infrastructures may remain open while the request is processed. If a number of long-running service requests are processed synchronously in a service platform 200, then the number of open threads may become large. The overhead of maintaining those threads may burden the service platform 200, potentially delaying the processing of service requests and preventing new service requests from being accepted. However, the service platform 200 may be able to process a large number of short-running service requests, each of which keeps its associated threads open for only a short time, without becoming overburdened. By identifying service requests that are potentially long-running, and routing those service requests to a separate messaging bus 220 and/or separate processing hardware/software 230, the service bus 210 may be able to close one or more open threads associated the long-running requests while those requests are being processed on the asynchronous processing hardware/software 230. Accordingly, the service bus 210 may have more resources free to receive and process a larger number of short-running service requests.

As discussed above, the determination in step 303 for a service request may be based on the expected response time of the service request. One or more computer servers within the service bus 210, or other devices in the service platform 200, may compare the expected response time of the service request to a response time threshold. If the expected response time is greater than the threshold (e.g., 1 second, 2 seconds, . . . , 5 seconds, etc.), then the service request will be designated for asynchronous processing (303:Async). Otherwise, the service request will be designated for synchronous processing (303:Sync). If the expected response time from step 302 is a percentile (e.g., fastest 10% of service requests, fastest 50% of service requests, etc.), or an enumerated value (e.g., very short running, short running, average, long running very long running, etc.), then the thresholds/comparisons in step 303 may be adjusted accordingly.

In some embodiments, the determination in step 303 for a service request may be based on other factors in addition to (or instead of) the expected response time of the service request, such as the current processing load, network conditions, or other resource usage data at the service platform 200 and/or the service providers 260. For example, if the service platform 200 has a low current usage level when a service request is received, as determined by the number of open threads in the service bus thread pool 215, the available processing capacity within the processing hardware/software 230 or 240, and other factors, then the response time threshold may be raised (or ignored altogether) so that more service requests are processed synchronously. Similarly, during times of low resource availability and/or high system usage (e.g., a low number of available threads in the service bus thread pool 215, high resource usage loads on processing infrastructures 230 and 240, high network traffic or congestion, etc.), then the response time threshold may be lowered (or even reduced to zero) so that more service requests are processed asynchronously.

If the service platform 200 (e.g., a computer server within the service bus 21) determines that the service request should be processed synchronously (303:Sync), then the service request may be routed for processing to a synchronous processing infrastructure 240 in step 304. During the processing of the service request, the synchronous processing infrastructure 240 may invoke one or more operations or functions of software services executing at back-end service providers 260 (e.g., .NET or JAVA web services, databases, mainframes and legacy systems, etc.). The synchronous processing infrastructure 240 also may perform additional processing on the data transmitted to and/or received from the back-end services.

During the processing of the service request by the synchronous processing infrastructure 240, one or more process threads from the service bus thread pool 215 related to the processing of the service request may remain open on the service bus 210. For example, for each currently processing service request, the service bus 210 may keep open a listening thread having a connection open to the user device and/or consumer application 250 that initiated the service request, and calling thread configured to await a response from the processing infrastructure 240. One or more additional threads may be open within the processing infrastructure 240 to process the service request and communicate with the service providers 260, and/or additional threads within the service bus 210 or the processing infrastructure 240 may be configured to perform various additional functions related to the service request.

In step 305, a response to the service request (or a status/error information associated with the service request) may be received at the service bus 210, or other component within the service platform 200, from the synchronous processing infrastructure 240. After receiving the response (or status/error information) from the processing infrastructure 240, the service bus 210 may perform one or more additional processing tasks and then transmit the response (or status/error information) in step 306 to the user device running the consumer application 250. In conjunction with the transmission of the service request response to the consumer application 250, or after transmitting the response, any open threads associated with the service request may be closed and the memory and processing resources used by those threads may be returned to the available resource pools within the service bus 210 and/or other components within the service platform 200.

Returning to step 303, if the service platform 200 (e.g., a computer server within the service bus 210) determines that the service request should be processed asynchronously (303:Async), then the service request may be forwarded to a messaging bus 220 in step 307. Then, in step 308, the service request may be routed from the messaging bus 220 to the asynchronous processing infrastructure 230. In some embodiments, after determining that the service request should be processed asynchronously (303:Async), the service bus 210 may place a message on a queue of the messaging bus 220 corresponding to the service to be invoked by the service request. Service implementations within the asynchronous processing infrastructure 230 may be configured to listen to their designated queues residing on the messaging bus 220.

In some embodiments, after forwarding the service request to the messaging bus 220, one or more open threads on the service bus 210 associated the service request may be closed. As discussed above, the service bus 210 may be configured to maintain at least a listening thread (having an connection open to the consumer application 250) and a calling thread (configured to await a response from the processing infrastructure 240) for each service request processing currently being processed. When the service request is forwarded to the messaging bus 210, one or more of the listening thread, calling thread, and/or other threads may be closed on the service bus 210.

Service requests received by the messaging bus 220 may be processed using threads from the messaging bus thread pool 225. However, the messaging bus 220 may employ a different thread management scheme than the service bus 210. For example, the messaging bus 220 might not keep open a listening thread or a calling thread for each service request currently processing. Instead, the messaging bus 220 may use a single thread (or fixed number multiple of threads) from the thread pool 225 to listen for all incoming service requests, and another thread (or fixed number multiple of threads) to wait for and receive responses from the processing infrastructure 240 for any service request. The remaining threads in the messaging bus thread pool 225 may be used for processing tasks for service requests, when a service request is ready to be processed. However, unlike the service bus 210 described in the above examples, the messaging bus 220 in this case might not have any open and idle threads while processing service requests, such as listening or calling threads that are associated with specific service requests and waiting idle for processing to be performed for those service requests.

Although a messaging bus 220 is used in this example, the messaging bus 220 may be optional and need not be included in some embodiments. For example, a service bus 210 may be configured to route service requests designated for asynchronous processing (303:Async) directly to an asynchronous processing infrastructure 240. In such examples, a certain number of threads in the service bus 210 may be dedicated to supporting asynchronous processing for the service requests designated for asynchronous processing. Additionally, the service bus 210 may keep one or more threads open (e.g., a listening thread) that may have been closed if the service request were forwarded to a messaging bus 220.

The service request processing performed by the asynchronous processing infrastructure 230 in step 308 may be similar to (or the same as) the service request processing performed by the synchronous processing infrastructure 240, described above. For example, one or more computer servers within the asynchronous processing infrastructure 230 may invoke operations or functions of various software services at back-end service providers 260, and also may perform additional processing on the data transmitted to and/or received from the back-end services.

As shown in FIG. 2, the asynchronous processing infrastructure 230 may be separate from the synchronous processing infrastructure 240. In some embodiments, the processing servers, memory, networks, and other hardware/software resources may be entirely separate from one another, so that the asynchronous processing infrastructure 230 handles only the service requests that are processed asynchronously, and the synchronous processing infrastructure 230 handles only the service requests that are processed synchronously. In some cases, there may be potential advantages in using two or more separate hardware/software infrastructures, as network congestion, processing backlogs, hardware failures, and other issues affecting one processing infrastructure need not affect the other processing infrastructures. However, in some examples, the asynchronous processing infrastructure 230 and synchronous processing infrastructure 240 need not be separate, but may consist of a single processing infrastructure configured to process service requests designated for either asynchronous and synchronous processing. In still other examples, certain components of the processing infrastructures 230 and 240 may be separated (e.g., processing servers), while certain other components (e.g., network hardware devices) may be shared between infrastructures.

In step 309, a response to the service request (or status information) may be received at the messaging bus 220, or other component within the service platform 200, from the synchronous processing infrastructure 230. After receiving the response from the processing infrastructure 230, the messaging bus 220 may perform one or more additional processing tasks and then transmit the response (or status information) in step 310 to the user device running the consumer application 250 that initiated the service request. In some embodiments, consumer applications 250 may be configured to receive notifications from the messaging bus 220 that a service request called asynchronously has been completed. For example, a consumer application 250 may obtain the results of a service request from a "Topic" on the messaging bus 220 to which the consumer application 250 has subscribed. In this case, results may be delivered asynchronously from the messaging bus 220 to the consumer application 250, similar to placing emails in an inbox. Such examples may provide the consumer application 250 with more flexibility in cases when a response is not required immediately (e.g., batch processing) and may alleviate pressure on service bus thread pool 215. In other examples, the service bus 210 may provide the messaging bus 220 with information identifying the consumer application 250 and/or connection information allowing the messaging bus 220 to establish a connection with the consumer application 250 that initiated the service request. Responses to service requests may be transmitted from the messaging bus 220 back to consumer applications 250 in a manner similar (or identical) to responses transmitted from the service bus 210. Thus, a consumer application 250 need not know whether a service request was processed synchronously or asynchronously, and the consumer 250 need not change any functionality depending on whether the response transmitted from the service bus 210 or the messaging bus 220.

The methods, systems and other features described herein may further be implemented through any number of computer readable media (e.g., memory) that are able to store computer readable instructions. Examples of computer readable media that may be used include RAM, ROM, EEPROM, flash memory or other memory technology, CD-ROM, DVD or other optical disk storage, magnetic cassettes, magnetic tape, magnetic storage and the like.

Although specific examples of carrying out the features herein have been described, those skilled in the art will appreciate that there are numerous variations and permutations of the above-described systems and methods that are contained within the spirit and scope of the invention as set forth in the appended claims. Additionally, numerous other embodiments, modifications and variations within the scope and spirit of the appended claims will occur to persons of ordinary skill in the art from a review of this disclosure.

The invention claimed is:

1. An apparatus comprising:
one or more processors; and
memory storing computer readable instructions that, when executed, cause the apparatus to:
receive, by a first bus, a service request from an application;
determine, by the first bus, an expected response time for the service request;
route, by the first bus and responsive to determining that the expected response time for the service request is greater than a threshold, the service request to asynchronous processing hardware via a second bus; and
route, by the first bus and responsive to determining that the expected response time for the service request is not greater than the threshold, the service request to a synchronous processing hardware separate from the asynchronous processing hardware.

2. The apparatus of claim 1, the memory storing computer readable instructions that, when executed, further cause the apparatus to:
select a synchronous processing mode for processing the service request responsive to determining that the expected response time for the service request is not greater than the threshold;

select an asynchronous processing mode for processing the service request responsive to determining that the expected response time for the service request is greater than the threshold;

receive a response to the service request and transmit the response to the application, when the synchronous processing mode is selected for processing the service request; and not receive a response to the service request, when the asynchronous processing mode is selected for processing the service request.

3. The apparatus of claim 1, wherein the synchronous processing hardware supports a first thread pool for processing synchronous service requests and wherein the asynchronous processing hardware supports a second thread pool for processing asynchronous service requests.

4. The apparatus of claim 1, the memory storing further computer readable instructions that, when executed, cause the apparatus to:

determine a first service request type of the service request;

retrieve previous service request response time data corresponding to a plurality of response times for previous service requests of the first service request type; and determine the expected response time for the service request by analyzing the previous service request response time data.

5. The apparatus of claim 1, the memory storing further computer readable instructions that, when executed, cause the apparatus to:

determining one or more services or operations called during a processing of the service request; and determine the expected response time for the service request based on the one or more services or operations called during the processing of the service request.

6. The apparatus of claim 1, wherein the first bus supports a first thread pool for processing synchronous service requests and the synchronous processing hardware supports a second thread pool for processing synchronous service requests.

7. The apparatus of claim 6, wherein the first thread pool is associated with the second thread pool and wherein processing synchronous service requests comprises simultaneously holding open one or more process threads on the first bus and one or more process threads on the synchronous processing hardware.

8. The apparatus of claim 1, the memory storing computer readable instructions that, when executed, further cause the apparatus to:

open one or more threads related to a processing of the service request; and use the one or more threads, after routing the service request, to receive a response associated with the service request or to transmit a response associated with the service request to the application.

9. A method comprising:

receiving, by a first bus, a service request from a first application;

determining, by the first bus, an expected response time for the service request;

routing, by the first bus, the service request to a first computing device when the expected response time for the service request is not above a threshold, wherein the first computing device is configured to synchronously process and respond to service requests from the first application; and routing, by the first bus and via a second bus, the service request to a second computing device when the expected response time for the service request is above the threshold, wherein the second computing device is separate from the first computing device and is configured to asynchronously process and respond to service requests from the first application.

10. The method of claim 9, wherein the determining the expected response time for the service request occurs after receiving the service request from the first application.

11. The method of claim 9, further comprising:

receiving, by the second computing device, a second service request associated with a second application;

assigning, by the second computing device, the second service request to processing hardware within the second computing device;

receiving, by the second computing device, a response to the second service request from the processing hardware; and forwarding, by the second computing device, the response to the second application.

12. The method of claim 9, wherein the first computing device and the second computing device each comprise a plurality of processing servers configured to process and respond to service requests from applications, and wherein no processing servers are shared between the first computing device and the second computing device.

13. The method of claim 9, wherein the first computing device supports a first thread pool for processing service requests synchronously, and wherein the second computing device supports a second thread pool for processing service requests asynchronously.

14. The method of claim 9, further comprising:

determining a service request type associated with the service request;

retrieving previous service request response time data, the previous service request response time data corresponding to a plurality of response times for previous service requests of the service request type; and determining the expected response time for the service request by analyzing the previous service request response time data.

15. The method of claim 9, further comprising:

determining one or more services or operations called during a processing of the service request; and determining the expected response time for the service request based on the one or more services or operations called during the processing of the service request.

16. A method, comprising:

receiving, by a computing device, a first service request from a first application;

determining, after receiving the first service request, an expected running time for the first service request;

selecting, by the computing device, a synchronous processing mode for the first service request when the expected running time for the first service request is not above a threshold or an asynchronous processing mode for the first service request when the expected running time for the first service request is above the threshold;

when the synchronous processing mode is selected for the first service request:

forwarding the first service request for synchronous processing;

keeping open one or more threads relating to a processing of the first service request, after forwarding the first service request for synchronous processing;

using one or more open threads to receive a response to the first service request or to transmit a response to the first service request to the first application; and when the asynchronous processing mode is selected for the first service request, forwarding the first service request for asynchronous processing.

17. The method of claim 16, further comprising:
when the asynchronous processing mode is selected for the first service request, routing the first service request to a messaging bus; and
when the synchronous processing mode is selected for the first service request, not routing the first service request to the messaging bus.

18. The method of claim 16, wherein at least one of the one or more threads is not kept open after forwarding the first service request for processing, when the asynchronous processing mode is selected for the first service request.

19. The method of claim 16, further comprising:
determining a first service request type of the first service request;
retrieving previous service request response time data corresponding to a plurality of response times for previous service requests of the first service request type; and
determining the expected running time for the first service request by analyzing the previous service request response time data.

20. The method of claim 16, further comprising:
determining one or more services or operations called during a processing of the first service request; and
determining the expected running time for the first service request based on the one or more services or operations called during the processing of the first service request.

* * * * *